(12) United States Patent
Yaguchi et al.

(10) Patent No.: US 10,374,241 B2
(45) Date of Patent: Aug. 6, 2019

(54) FUEL CELL SYSTEM

(71) Applicant: NISSAN MOTOR CO., LTD., Yokohama-shi, Kanagawa (JP)

(72) Inventors: Tatsuya Yaguchi, Kanagawa (JP); Motohisa Kamijo, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/741,711

(22) PCT Filed: Jul. 8, 2015

(86) PCT No.: PCT/JP2015/069594
§ 371 (c)(1),
(2) Date: Jan. 3, 2018

(87) PCT Pub. No.: WO2017/006450
PCT Pub. Date: Jan. 12, 2017

(65) Prior Publication Data
US 2018/0198142 A1 Jul. 12, 2018

(51) Int. Cl.
*H01M 8/04701* (2016.01)
*H01M 4/86* (2006.01)
(Continued)

(52) U.S. Cl.
CPC ......... *H01M 8/04738* (2013.01); *H01M 4/86* (2013.01); *H01M 4/8636* (2013.01); *H01M 4/8642* (2013.01); *H01M 4/8652* (2013.01); *H01M 8/0618* (2013.01); *H01M 8/0625* (2013.01); *H01M 8/0637* (2013.01); *H01M 8/1213* (2013.01); *H01M 8/1253* (2013.01); *H01M 8/249* (2013.01);
(Continued)

(58) Field of Classification Search
CPC ............. H01M 8/0618; H01M 8/0612; H01M 8/1213; H01M 8/0637
See application file for complete search history.

(56) References Cited

U.S. PATENT DOCUMENTS 5,348,814 A 9/1994 Miikura et al.
2002/0114990 A1* 8/2002 Fly ..................... H01M 8/0228
429/434

(Continued)

FOREIGN PATENT DOCUMENTS

EP 1 441 406 A2 7/2004
EP 1 507 302 A2 2/2005
(Continued)

*Primary Examiner* — Olatunji A Godo
(74) *Attorney, Agent, or Firm* — Foley & Lardner LLP

(57) ABSTRACT

The present invention comprises a plurality of fuel cells connected to each other in series, and a reformer configured to reform raw fuel, wherein reformed fuel by the reformer is supplied to a first stage of the plurality of fuel cells, and the fuel cell on the first stage is provided with a methane reaction suppressing function which suppresses reaction of methane included in the reformed fuel to a larger extent than at least one fuel cell on a second and later stages. Suppressing temperature drop due to endothermic reaction in the fuel cell on the first stage can improve the efficiency of electric power generation of the fuel cell system having the plurality of fuel cells arranged in series.

18 Claims, 8 Drawing Sheets

(51) Int. Cl.
  *H01M 8/0612* (2016.01)
  *H01M 8/1253* (2016.01)
  *H01M 8/2425* (2016.01)
  *H01M 8/0637* (2016.01)
  *H01M 8/1213* (2016.01)
  *H01M 8/249* (2016.01)
  *H01M 8/124* (2016.01)

(52) U.S. Cl.
  CPC .. *H01M 8/2425* (2013.01); *H01M 2004/8684* (2013.01); *H01M 2008/1293* (2013.01); *Y02E 60/566* (2013.01)

(56) References Cited

U.S. PATENT DOCUMENTS

| | | | |
|---|---|---|---|
| 2006/0286417 A1* | 12/2006 | Aoyama | C01B 3/382 429/411 |
| 2008/0248349 A1 | 10/2008 | McElroy et al. | |
| 2010/0047641 A1* | 2/2010 | Jahnke | H01M 8/04291 429/415 |
| 2010/0183938 A1 | 7/2010 | Iijima et al. | |
| 2011/0070509 A1 | 3/2011 | Mai | |
| 2012/0178005 A1 | 7/2012 | Kusnezoff et al. | |
| 2013/0014484 A1 | 1/2013 | Caprile et al. | |

FOREIGN PATENT DOCUMENTS

| | | |
|---|---|---|
| JP | 05-325996 A | 12/1993 |
| JP | 07-045293 A | 2/1995 |
| JP | 2005-203258 A | 7/2005 |
| JP | 2008-305600 A | 12/2008 |
| JP | 2009-021195 A | 1/2009 |
| JP | 2010-282772 A | 12/2010 |
| JP | 2011-525295 A | 9/2011 |
| JP | 2012-3934 A | 1/2012 |
| JP | 2012-531719 A | 12/2012 |
| JP | 2013-211107 A | 10/2013 |
| JP | 2014-229438 A | 12/2014 |
| JP | 2016-100137 A | 5/2016 |

* cited by examiner (a)

(b)

(a)

(b)

(a)

(b)

FUEL CELL SYSTEM

TECHNICAL FIELD

The present invention relates to a fuel cell system which supplies fuel and oxidizer to a fuel cell and causes it to generate electric power.

BACKGROUND ART

A general solid-oxide type fuel cell uses an oxide ion conductive material as electrolyte and requires an operating temperature of 500° C. or more to obtain ion conductivity. Accordingly, the solid-oxide type fuel cell, which requires warm-up time in the case of cold-start, has been conventionally used mainly for stationary equipment with a low frequency of cold-start.

Accordingly, in view of adapting the aforementioned fuel cell to a mobile body, there has been proposed a multi-stage fuel cell system having small fuel cells and large fuel cells in order to support both quick startability and high output required for a mobile body (see Patent Literature 1).

CITATION LIST

Patent Literature

Patent Literature 1: European Patent Publication No. 1507302

SUMMARY OF INVENTION

When a conventional multi-stage fuel cell system described above has a plurality of fuel cells piping-connected in series, a fuel cell on the first stage causes a large endothermic reaction (steam reforming reaction: $CH_4 + H_2O \rightarrow 3H_2 + CO$) when generating electric power, due to a large amount of methane included in the fuel reformed by a reformer located upstream thereof. Accordingly, the fuel cell on the first stage, despite generating heat, results in temperature drop which leads to decreased efficiency of electric power generation due to the large endothermic reaction.

Thus, it is an object of the present invention to suppress the decrease in the electric power generation efficiency of the fuel cell system having a plurality of fuel cells arranged in series.

In the fuel cell system according to the present invention, the fuel cell on the first stage, among a plurality of fuel cells connected to each other in series, has a methane reaction suppressing function which suppresses reaction of methane included in reformed fuel to a larger extent than at least one of the fuel cells on the second and later stages.

BRIEF DESCRIPTION OF DRAWINGS

FIG. 2 is a schematic plan view illustrating a reaction region of fuel cells in the fuel cell system of FIG. 1, in which FIG. 2(a) illustrates a fuel cell on the first stage and FIG. 2(b) illustrates a fuel cell on the second stage.

FIG. 3 illustrates a methane reaction suppressing function of the first embodiment, in which FIG. 3(a) is a schematic cross-sectional view of an electrolyte and fuel poles of the fuel cell on the first stage and FIG. 3(b) is a schematic cross-sectional view of an electrolyte and fuel poles of the fuel cell on the second stage.

FIG. 6 illustrates a methane reaction suppressing function of a second embodiment, in which FIG. 6(a) is a schematic cross-sectional view of an electrolyte and fuel poles of the fuel cell on the first stage and FIG. 6(b) is a schematic cross-sectional view of electrolyte and fuel poles of the fuel cell on the second stage.

FIG. 7 illustrates a methane reaction suppressing function of a third embodiment, in which FIG. 7(a) is a schematic cross-sectional view of an electrolyte and fuel poles of the fuel cell on the first stage and FIG. 7(b) is a schematic cross-sectional view of an electrolyte and fuel poles of the fuel cell on the second stage.

DESCRIPTION OF EMBODIMENTS

Hereinafter, embodiments for implementing the present invention will be described in detail with reference to the drawings.

Figure 1:
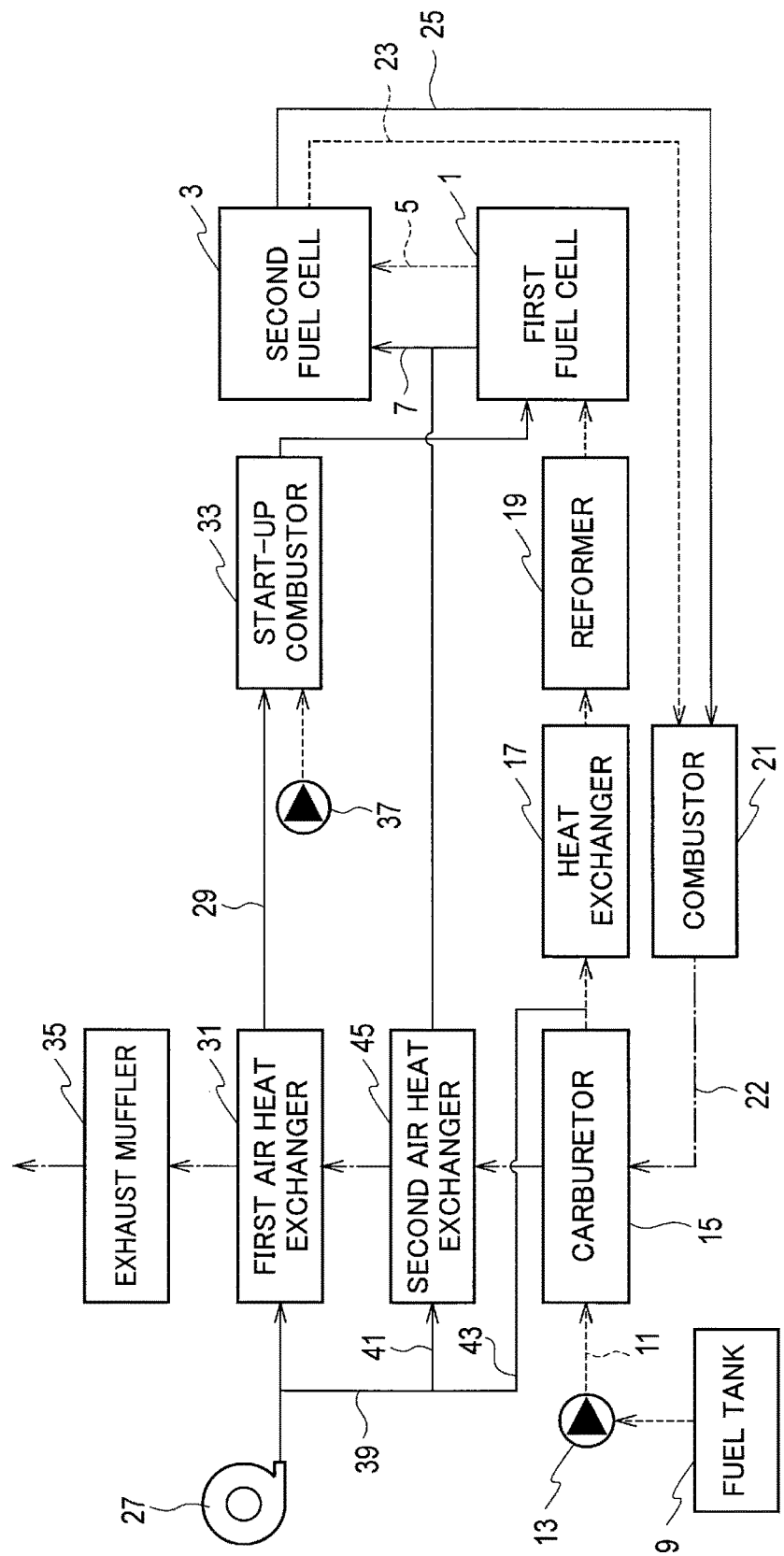
FIG. 1 is an overall configuration diagram of a fuel cell system according to a first embodiment of the present invention.

FIG. 1 is an overall configuration diagram of a fuel cell system common to respective embodiments described below. A first fuel cell 1 on the first stage and a second fuel cell 3 on the second stage in a fuel cell system are solid-oxide type fuel cells (SOFC). The first and the second fuel cells 1 and 3 have respectively supplied thereto hydrogen as fuel and air as oxidizer to generate electric power.

The first and the second fuel cells 1 and 3 have a plurality of cells stacked to form fuel cell stack. One cell includes electrolyte, a fuel pole, an oxygen pole, a fuel-pole-side separator forming a fuel-flow path, and an oxygen-pole-side separator forming an air-flow path.

Figure 2:
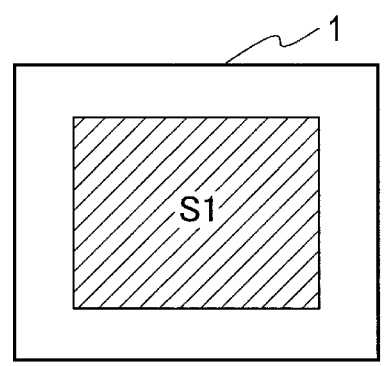
Figure 2:
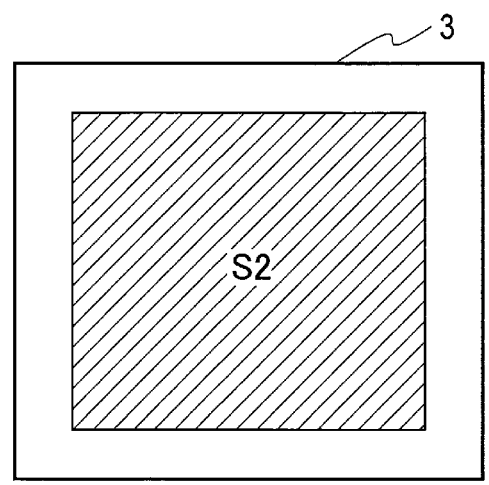

The first fuel cell 1 is smaller in electric power generation capacity and size than the second fuel cell 3. In order to downsize the first fuel cell 1, the area of a reaction (electric power generation) region S1 of an electrode of the first fuel cell 1 indicated by slant lines is made smaller than a reaction (electric power generation) region S2 of an electrode of the second fuel cell 3 indicated by slant lines, as illustrated in FIG. 2. When stacking fuel cells, the first fuel cell 1 is made smaller than the second fuel cell 3 in terms of the total area of reaction regions of all of the plurality of cells.

The first fuel cell 1 and the second fuel cell 3 are connected to each other in series via a fuel piping 5 and an air piping 7. In other words, a plurality of fuel cells is connected to each other in series. The first fuel cell 1 is located upstream side to the second fuel cell 3 in the flow of fuel and air.

A fuel supply piping 11 connecting the first fuel cell 1 and a fuel tank 9 has provided thereon a fuel pump 13, a carburetor 15, a heat exchanger 17, and a reformer 19, respectively, in the order from side of the fuel tank 9. Raw fuel in the fuel tank 9 includes hydrocarbon-based fuel such as gasoline, light oil or kerosene, or alcohol-based liquid fuel such as methanol or ethanol.

The fuel pump 13 sends liquid fuel from the fuel tank 9 to the carburetor 15. The carburetor 15 turns the raw fuel into sprayed mist by ejecting liquid fuel from an unillustrated nozzle, for example, and by ejecting the pressurized liquid fuel from micropores of the nozzle. Furthermore, a combustor 21 is connected to the carburetor 15 via a combustion exhaust pipe 22, and the sprayed mist of raw fuel is vaporized using the exhaust heat of the combustor 21. The heat exchanger 17 uses the combustor 21 to exchange heat with, and raise the temperature of, the raw fuel vaporized by the carburetor 15.

The combustor 21 and the second fuel cell 3 are connected to each other via a fuel discharge pipe 23 and an air discharge pipe 25. In other words, discharged fuel discharged from the second fuel cell 3 is supplied to the combustor 21 through the fuel discharge pipe 23, and discharged air discharged from the second fuel cell 3 is supplied to the combustor 21 through the air discharge pipe 25. The combustor 21 performs combustion using the supplied discharged fuel and discharged air as the raw fuel.

An air supply piping 29 connecting the first fuel cell 1 and an air compressor 27 has provided thereon a first air heat exchanger 31 and a start-up combustor 33, respectively, in the order from the air compressor 27 side. The air compressor 27 sends fresh air (air) to the first air heat exchanger 31. The first air heat exchanger 31 raises the temperature of air sent from the air compressor 27 by exchanging heat with combustion gas supplied via the combustion exhaust pipe 22 described above. The exhaust air exhausted from the first air heat exchanger 31 is exhausted outside via an exhaust muffler 35.

The start-up combustor 33 is connected to the fuel tank 9 via an unillustrated fuel piping and combusts liquid fuel supplied thereto from the fuel tank 9 by a fuel pump 37. The air sent to the start-up combustor 33 from the first air heat exchanger 31 is heated by combustion heat of the start-up combustor 33 whereby its temperature rises.

The air supply piping 29 between the air compressor 27 and the first air heat exchanger 31 has an air manifold 39 connected thereto in a branched manner. The air manifold 39 is further branched into a second air supply piping 41 and an air mixing pipe 43.

The second air supply piping 41, having a second air heat exchanger 45 provided midway thereof, is connected to the air piping 7. In the second air heat exchanger 45, exhaust heat flowing through the combustion exhaust pipe 22 heats and raises the temperature of air, and the air with raised temperature is supplied to the second fuel cell 3. The air mixing pipe 43 has the fuel supply piping 11 connected between the carburetor 15 and the heat exchanger 17, which mixes the air sent from the air compressor 27 with the raw fuel flowing through the fuel supply piping 11.

The fuel cell system configured as described above operates in the following manner.

Liquid fuel is sent from the fuel tank 9 to the carburetor 15 by the fuel pump 13, and further, vaporized raw fuel is sent to the reformer 19 via the heat exchanger 17. On this occasion, a part of the air sent from the air compressor 27 is mixed into raw fuel in the fuel supply piping 11 through the air manifold 39 and the air mixing pipe 43, and subsequently sent to the reformer 19 via the heat exchanger 17.

The reformer 19 decomposes the raw fuel and also the water and air mixed in the raw fuel at a high temperature, and reforms them into constituents such as $H_2$, $CH_4$, $CO$, $CO_2$, $H_2O$, and the reformed fuel is supplied to the first fuel cell 1. On the other hand, the air sent from the air compressor 27 has its temperature raised through the first air heat exchanger 31 and the start-up combustor 33, and is supplied to the first fuel cell 1.

The first fuel cell 1 generates electric power utilizing the reaction between the reformed fuel supplied thereto and oxygen, which is the oxidizer in the atmosphere. The first fuel cell 1 is smaller in electric power generation capacity and size than the second fuel cell 3, and therefore is activated in a shorter time. Subsequent to electric power generation by the first fuel cell 1, surplus fuel and air are supplied to the second fuel cell 3 respectively through the fuel piping 5 and the air piping 7. On this occasion, a part of the air from the air compressor 27 is supplied to the second fuel cell 3 through the air manifold 39 and the second air supply piping 41.

The second fuel cell 3 generates electric power utilizing the reaction between the supplied fuel and oxygen which is the oxidizer in the atmosphere. Subsequent to electric power generation by the second fuel cell 3, surplus fuel and air are supplied for combustion to the combustor 21 respectively through the fuel discharge pipe 23 and the air discharge pipe 25.

Application to an automobile, among mobile bodies, requires support of both quick startability and high output. Accordingly, the total reaction area of the first fuel cell 1 on the first stage is made smaller than the total reaction area of the second fuel cell 3 on the second stage, so as to reduce the heat capacity of the first fuel cell 1 on the first stage. While realizing quick startability by the first fuel cell 1 with reduced heat capacity, a large output is obtained from electric power generation by the two fuel cells 1 and 3 after having activated the second fuel cell 3. Accordingly, there may be provided a fuel system suitable for an automobile.

The first fuel cell 1 with reduced heat capacity generates a small amount of heat when generating electric power, and is therefore effective for suppressing temperature drop by providing a methane reaction suppressing function described below to suppress the amount of absorbed heat so that the amount of absorbed heat does not exceed the amount of generated heat.

Next, respective embodiments will be described in which the first fuel cell 1 on the first stage is provided with a methane reaction suppressing function.

Figure 3:
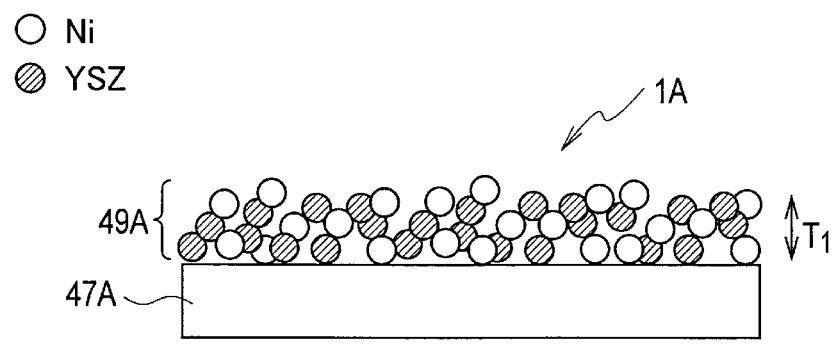
Figure 3:
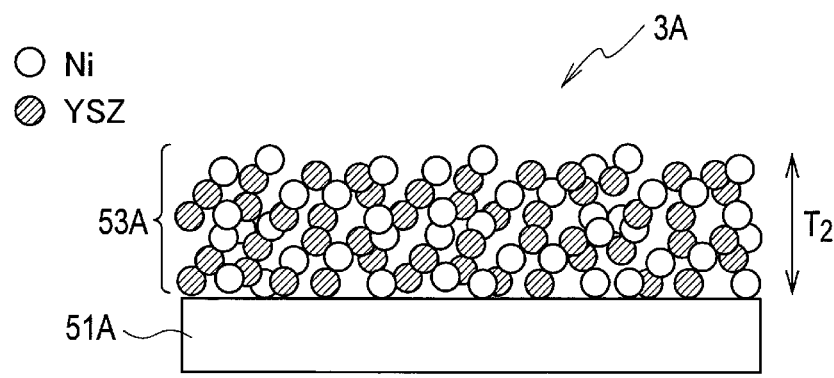

FIG. 3 illustrates a methane reaction suppressing function of a first embodiment. FIG. 3($a$) illustrates a schematic cross-sectional view of an electrolyte 47A and fuel poles 49A of a first fuel cell 1A on the first stage, and FIG. 3($b$) illustrates a schematic cross-sectional view of an electrolyte 51A and fuel poles 53A of a second fuel cell 3A on the second stage.

In both of the fuel cells 1A and 3A, the fuel poles 49A and 53A include Ni (nickel) and YSZ (yttria-stabilized zirconia). The electrolytes 47A and 51A include YSZ.

The first embodiment is intended to provide the first fuel cell 1A with a methane reaction suppressing function by making the thickness $T_1$ of the fuel poles 49A in the first fuel cell 1A on the first stage thinner than the thickness $T_2$ of the fuel poles 53A in the second fuel cell 3A on the second stage. The respective thicknesses $T_1$ and $T_2$ of the fuel poles 49A and 53A correspond to the thickness of a part where a three-phase interface is formed at which hydrogen ions, electrons and fuel gas adjoin each other. The aforementioned hydrogen ions, electrons and fuel gas can be respectively replaced by electrolyte (liquid phase), fuel poles (solid-phase) and hydrogen (gas phase).

It is known that thinning the thickness of fuel poles causes increase of local current density and, on this occasion, hydrogen reaction activity tends to be higher than methane. Therefore, reaction of methane can be suppressed when the first fuel cell 1A on the first stage generates electric power. Accordingly, the first fuel cell 1A can suppress the amount of absorbed heat during steam reforming reaction (endothermic reaction), even when a large amount of methane is included in the fuel reformed by the reformer 19.

Therefore, the first fuel cell 1A can cause the amount of generated heat to exceed the amount of absorbed heat, thereby securing the temperature required for stable operation. As a result, it is possible to suppress decrease of the electric power generation efficiency in the fuel cell system.

In this case, it becomes unnecessary to introduce a more-than-required amount of air into raw fuel to reduce methane during reforming, or heat the air for electric power generation beyond the operating temperature of the first fuel cell 1A on the first stage, in order to appropriately maintain the temperature of the first fuel cell 1A on the first stage. As a result, it is possible to suppress decrease of the electric power generation efficiency of the fuel cell system.

Methane whose reaction is suppressed at the first fuel cell 1A on the first stage turns out to be used by reacting during electric power generation by the second fuel cell 3A on the later stage with increased thickness of the fuel poles 53A, thereby allowing effective use of injected fuel.

Figure 4:
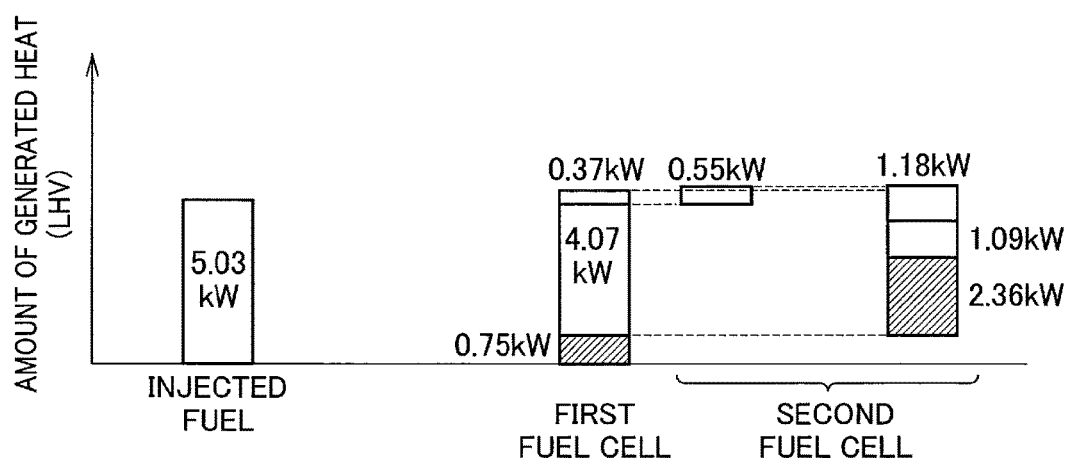
FIG. 4 is a graph illustrating the amount of generated heat when the fuel cell on the first stage is provided with the methane reaction suppressing function.
Figure 5:
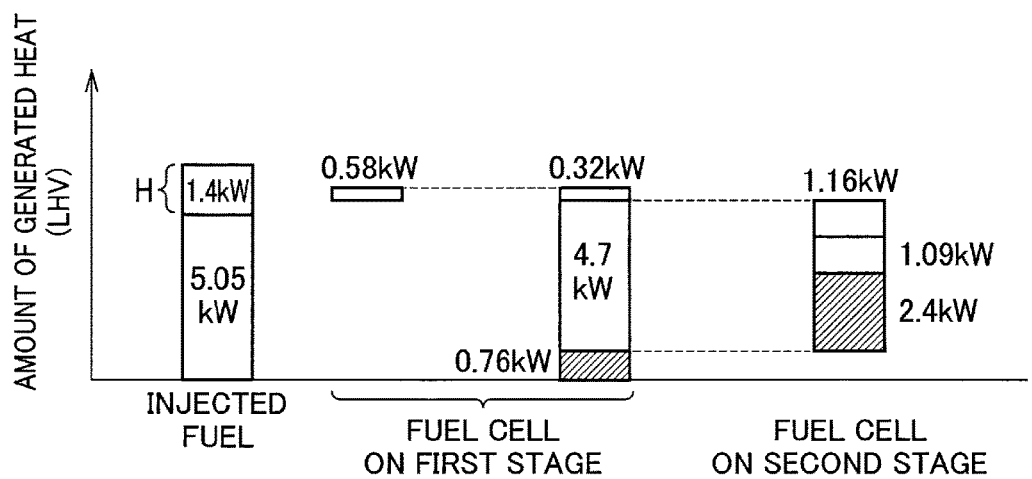
FIG. 5 is a graph illustrating the amount of generated heat when the fuel cell on the first stage is not provided with the methane reaction suppressing function as a comparative example.

FIG. 4 illustrates an amount of generated heat by injected fuel in a case where the first fuel cell 1A according to the first embodiment is provided with a methane reaction suppressing function, and FIG. 5 illustrates an amount of generated heat by injected fuel in a case where the fuel cell on the first stage is not provided with a methane reaction suppressing function as a comparative example.

In FIG. 5 illustrated as a comparative example, the amount of generated heat by the injected fuel, which is heating the air for electric power generation, is larger than that of the present embodiment of FIG. 4 by approximately the amount denoted H (1.4 kW). This is because the amount of absorbed heat (0.58 kW) due to the large amount of methane reaction in the fuel cell on the first stage exceeds the amount of generated heat (0.32 kW).

In the present embodiment of FIG. 4, methane reaction is suppressed in the first fuel cell 1A and therefore a large endothermic reaction such as that illustrated in FIG. 5 is suppressed, whereby an amount of generated heat (0.37 kW) is obtained. In addition, the amount of absorbed heat (0.55 kW) during electric power generation by the second fuel cell 3A, becomes approximately equal to the amount of absorbed heat (0.58 kW) during electric power generation by the fuel cell on the first stage in the comparative example due to internal reforming of the methane whose reaction is suppressed in the first fuel cell 1A. However, in the second fuel cell 3A, the amount of generated heat (1.18 kW) exceeds the amount of absorbed heat (0.55 kW) due to its large electric power generation capacity and therefore it is possible to secure the temperature required for stable operation.

In the present embodiment, it is possible to suppress the amount of generated heat by injected fuel to be low and obtain an approximately equal amount of generated electric power. Since, in the comparative example of FIG. 5, the amount of generated electric power (slant line part) is 3.16 (0.76+2.4) kW against the amount of heat 6.45 (5.05+1.4) kW by injected fuel, the electric power generation efficiency turns out to be 48%. The present embodiment, in contrast, exhibits a higher efficiency of 62% because the amount of generated electric power (slant line part) is 3.11 (0.75+2.36) kW against the amount of heat 5.03 kW by injected fuel.

Figure 6:
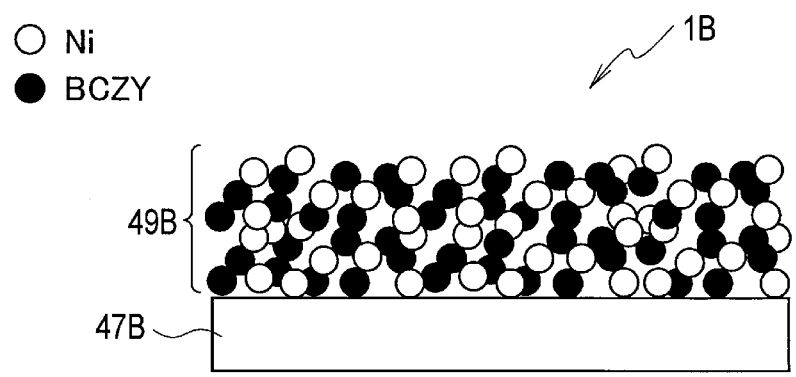
Figure 6:
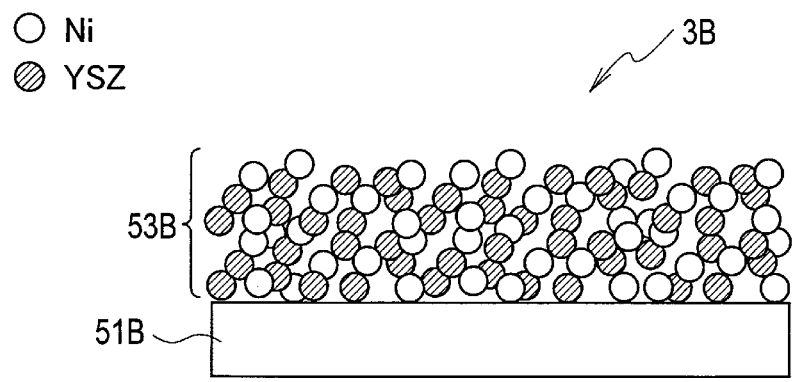

FIG. 6 illustrates a methane reaction suppressing function of a second embodiment. FIG. 6(a) illustrates a schematic cross-sectional view of an electrolyte 47B and fuel poles 49B of a first fuel cell 1B on the first stage, and FIG. 6(b) illustrates a schematic cross-sectional view of an electrolyte 51B and fuel poles 53B of a second fuel cell 3B on the second stage.

In the second embodiment, the fuel poles 49B of the first fuel cell 1B on the first stage includes Ni (nickel) and BCZY (BaCeZrY) which is a proton conductive material. The fuel poles 53B of the second fuel cell 3B on the second stage includes Ni and YSZ, similarly to the first embodiment. The electrolytes 47B and 51B are formed with a material including YSZ, similarly to the first embodiment.

Using a proton conductive material as the material of the fuel poles 49B allows for selective use of hydrogen during electric power generation in comparison with methane or carbon monoxide, whereby reaction of methane can be suppressed. In other words, the second embodiment is intended to provide the first fuel cell 1B on the first stage with a methane reaction suppressing function by using BCZY which is a proton conductive material as the material of the fuel poles 49B. Accordingly, the first fuel cell 1B can suppress the amount of absorbed heat during steam reforming reaction (endothermic reaction), even when a large amount of methane is included in the fuel reformed by the reformer 19.

Therefore, similarly to the first embodiment, the first fuel cell 1B can cause the amount of generated heat to exceed the amount of absorbed heat, thereby securing the temperature required for stable operation. As a result, it is possible to suppress decrease of the electric power generation efficiency in the fuel cell system.

In this case, it becomes unnecessary to introduce a more-than-required amount of air into raw fuel to reduce methane during reforming, or heat the air for electric power generation beyond the operating temperature of the first fuel cell 1B, in order to appropriately maintain the temperature of the first fuel cell 1B on the first stage. As a result, it is possible to suppress decrease of the electric power generation efficiency of the fuel cell system.

Figure 7:
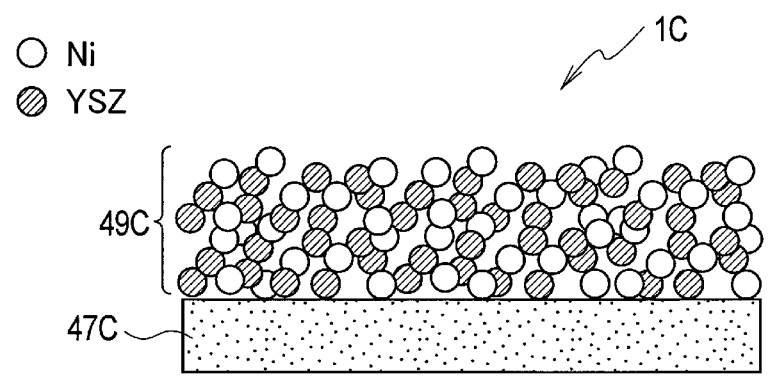
Figure 7:
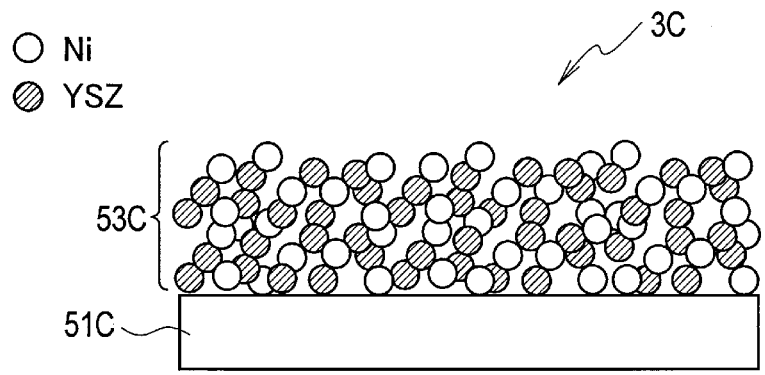

FIG. 7 illustrates a methane reaction suppressing function of a third embodiment. FIG. 7(a) illustrates a schematic cross-sectional view of an electrolyte 47C and fuel poles 49C of a first fuel cell 1C on the first stage, and FIG. 7(b) illustrates a schematic cross-sectional view of an electrolyte 51C and fuel poles 53C of a second fuel cell 3C on the second stage.

In the third embodiment, the electrolyte 47C of the first fuel cell 1C on the first stage includes BCZY which is a proton conductive material. The electrolyte 51C of the second fuel cell 3C on the second stage includes YSZ, similarly to the first embodiment. The fuel poles 49C and 53C include Ni and YSZ, similarly to the first embodiment.

Using a proton conductive material as the material of the electrolyte 47C allows for selective use of hydrogen during electric power generation in comparison with methane and carbon monoxide, whereby reaction of methane can be suppressed. In other words, the third embodiment is intended to provide the first fuel cell 1C on the first stage with a methane reaction suppressing function by using BCZY which is a proton conductive material as the material of the electrolyte 47C. Accordingly, the first fuel cell 1C can suppress the amount of absorbed heat during steam reforming reaction (endothermic reaction), even when a large amount of methane is included in the reformed fuel by the reformer 19.

Therefore, similarly to the first embodiment, the first fuel cell 1C can cause the amount of generated heat to exceed the amount of absorbed heat, thereby securing the temperature required for stable operation. As a result, it is possible to suppress decrease of the electric power generation efficiency in the fuel cell system.

In this case, it becomes unnecessary to introduce a more-than-required amount of air into raw fuel to reduce methane during reforming, or heat the air for electric power generation beyond the operating temperature of the first fuel cell 1C, in order to appropriately maintain the temperature of the first fuel cell 1C on the first stage. As a result, it is possible to suppress decrease of the electric power generation efficiency of the fuel cell system.

Figure 8:
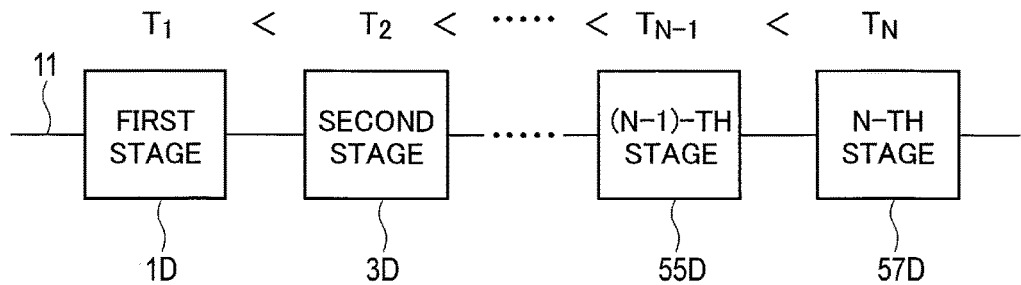
FIG. 8 illustrates a methane reaction suppressing function of a fourth embodiment and is an explanatory diagram illustrating an example in which the thickness of fuel poles of a fuel cell on a later stage is made thicker than that of preceding stages.
Figure 11:
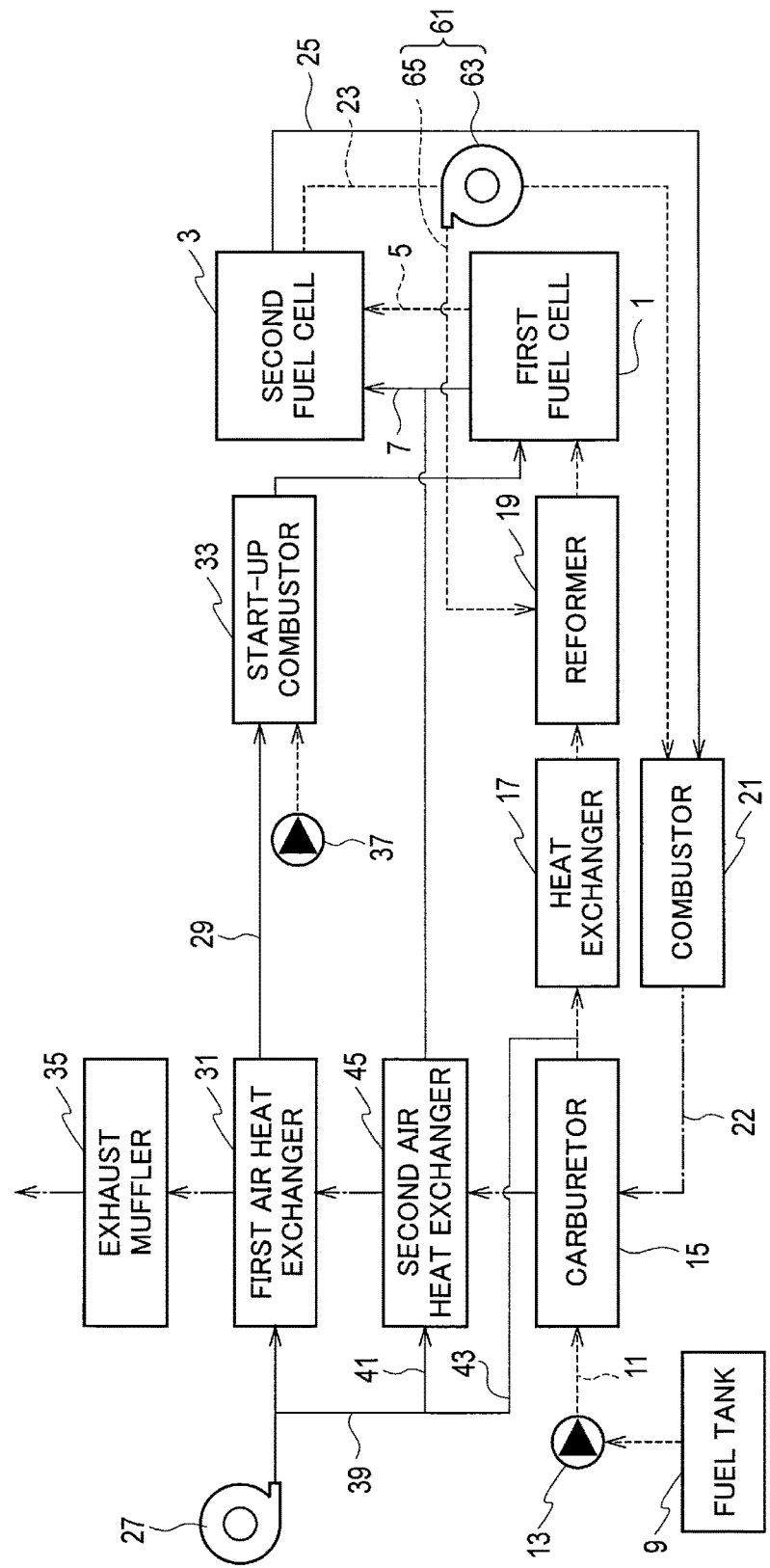
FIG. 11 is an overall configuration diagram of a fuel cell system according to a seventh embodiment.

FIG. 8 illustrates a methane reaction suppressing function of a fourth embodiment. The fourth embodiment, which is a modified example of the first embodiment illustrated in FIG. 3, has N fuel cells piping-connected in series, N being three or more, in addition to a first fuel cell 1D on the first stage and the second fuel cell 3D on the second stage. The fuel cell on the (N−1)-th stage is referred to as the (N−1)-th fuel cell 55D, and the fuel cell on the N-th stage is referred to as the N-th fuel cell 57D. Note that, in FIG. 8, only the fuel supply piping 11 in FIG. 11 is illustrated as the connection piping, whereas the air supply piping is omitted.

Each fuel pole of the plurality of fuel cells 1D to 57D includes Ni and YSZ, similarly to the first embodiment of FIG. 3. Each electrolyte also includes YCZ, similarly to the first embodiment. Similarly to the first embodiment, the thickness $T_1$ of the fuel poles of the first fuel cell 1D on the first stage is made thinner than the thickness $T_2$ of the fuel poles of the second fuel cell 3D on the second stage.

The thickness of the fuel poles is made thinnest at the first fuel cell 1D on the first stage and thickest at the N-th fuel cell 57D on the N-th stage which is the last stage, with the thickness gradually becoming thicker from the first fuel cell 1D to the N-th fuel cell 57D. In other words, letting $T_{N-1}$ be the thickness of the fuel poles of the (N−1)-th fuel cell 55D and $T_N$ be the thickness of the fuel poles of the N-th fuel cell 57D, $T_1<T_2<\ldots<T_{N-1}<T_N$ holds.

As described in the first embodiment of FIG. 3, thinning the thickness of the fuel poles results in suppressing methane reaction. Accordingly, when a plurality of fuel cells is connected in series, making the thickness of the fuel poles on later stages thicker results in weakening the function of suppressing methane reaction in later stages.

In other words, the fourth embodiment is intended to provide the plurality of fuel cells on the second and later stages with a later-stage methane reaction suppressing function, so that the function of suppressing methane reaction to be exhibited by the later-stage methane reaction suppressing function is gradually weakened at later stages.

Methane whose reaction is suppressed in a fuel cell on an upper stage flows into a fuel cell on a lower stage, and therefore there may be assumed a case where an uneven temperature distribution occurs inside the fuel cell on the lower stage, or, depending on the amount of generated electric power, the amount of endothermic reaction exceeds the amount of generated heat. Accordingly, measures are taken to suppress the amount of endothermic reaction of methane by weakening the methane reaction suppressing function in fuel cells on later stages so that the temperature distribution inside the fuel cell becomes more even, or the amount of absorbed heat does not exceed the amount of generated heat by electric power generation.

Figure 9:
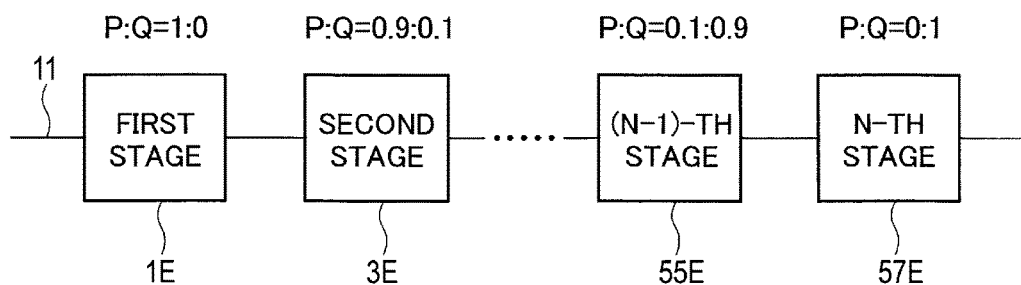
FIG. 9 illustrates a methane reaction suppressing function of a fifth embodiment, and is an explanatory diagram illustrating an example in which, with regard to the composition ratio between a proton conductive material, which is supposed to be the material of electrolyte, and an oxide conductive material, the proportion of the proton conductive material of a fuel cell on a later stage is made lower than that on preceding stages.

FIG. 9 illustrates a methane reaction suppressing function of a fifth embodiment. The fifth embodiment is a combination of the ideas of the third embodiment illustrated in FIG. 7 and the fourth embodiment illustrated in FIG. 8. The fifth embodiment, similarly to FIG. 8, has N fuel cells piping-connected in series, N being three or more, in addition to a first fuel cell 1E on the first stage and a second fuel cell 3E on the second stage. A fuel cell on the (N−1) is referred to as the (N−1)-th fuel cell 55E, and the fuel cell on the N-th stage is referred to as the N-th fuel cell 57E. Note that, in FIG. 9, only the fuel supply piping 11 in FIG. 11 is illustrated as the connection piping, whereas the air supply piping is omitted.

In the fifth embodiment, respective electrolytes of the first fuel cell 1E to the (N−1)-th fuel cell 55E, except for the N-th fuel cell 57E on the last stage, include BCZY, which is a proton conductive material similarly to the electrolyte 47C of the first fuel cell 1C in FIG. 7. In addition, respective electrolytes of the second fuel cell 3E on the second stage to the N-th fuel cell 57E on the last stage, except for the first fuel cell 1E on the first stage, include YCZ, which is an oxide conductive material. Each fuel pole of the fuel cells 1E to 57E includes Ni and YSZ, similarly to FIG. 7.

The electrolyte of the first fuel cell 1E on the first stage does not include YCZ, and therefore, letting P:Q be the ratio between the proton conductive material and the oxide conductive material, a ratio of P:Q=1:0 is obtained. The electrolyte of the N-th fuel cell 57E on the last stage does not include BCZY, and therefore a ratio of P:Q=0:1 is obtained. Subsequently, the electrolyte of the second fuel cell 3E on the second stage exhibits a ratio of P:Q=0.9:0.1, and the electrolyte of the (N−1)-th fuel cell 55E exhibits a ratio of P:Q=0.1:0.9.

As thus described, the composition ratio between the proton conductive material and the oxide conductive material is set for respective electrolytes of the first fuel cell 1E on the first stage to the N-th fuel cell 57E on the last stage so that the proportion of the proton conductive material in later stages becomes lower.

As described in the third embodiment of FIG. 7, using a proton conductive material as the material of the electrolyte allows for selective use of hydrogen during electric power generation in comparison with methane or carbon monoxide, whereby reaction of methane can be suppressed. Therefore, reducing the proportion of the proton conductive material for fuel cells on later stages weakens the function of suppressing methane reaction for later stages, similarly to the fourth embodiment of FIG. 8.

In other words, the fifth embodiment, similarly to the fourth embodiment, is intended to provide the plurality of fuel cells on the second and later stages with a later-stage methane reaction suppressing function, so that the function of suppressing methane reaction to be exhibited by the later-stage methane reaction suppressing function is gradually weakened for later stages. Therefore, the fifth embodiment brings about an operational effect that is similar to the fourth embodiment.

Figure 10:
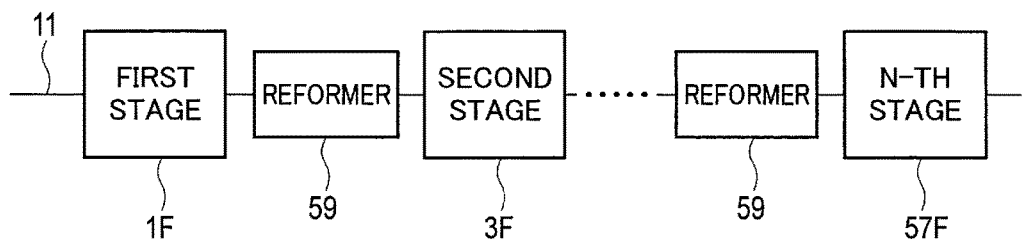
FIG. 10 illustrates a methane reaction suppressing function of a sixth embodiment and is an explanatory diagram illustrating an example in which a discharged fuel reformer is provided between fuel cells which are adjacent to each other among a plurality of fuel cells.

FIG. 10 illustrates a methane reaction suppressing function of a sixth embodiment. The sixth embodiment, similarly to the fourth embodiment of FIG. 8 and the fifth embodiment of FIG. 9, has a plurality of fuel cells ranging from a first fuel cell 1F to the N-th fuel cell 57F piping-connected in series. The sixth embodiment has a discharged fuel reformer 59 between fuel cells which are adjacent to each other among a plurality of fuel cells. Each discharged fuel reformer 59 reforms discharged fuel discharged from a fuel cell on a preceding stage (upstream).

The fuel cell of the preceding stage has a thermodynamic non-equilibrium composition in which a large amount of reaction-suppressed methane exists and also the content ratio of water and carbon dioxide is high due to electric power generation. Therefore, the composition is reformed to thermodynamic equilibrium by providing the discharged fuel reformer 59 on the fuel supply piping 11 between fuel cells.

During reforming, steam reforming reaction (endothermic reaction) of methane occurs, and although the temperature of reformed fuel becomes lower than the temperature of surrounding fuel cells, heat exchange with the fuel supply piping 11 which has reached a high temperature causes the temperature of reformed fuel to rise. Rising of the reformed fuel temperature prevents the temperature distribution in fuel cells on later stages from becoming uneven, or the amount of absorbed heat from exceeding the amount of generated heat by electric power generation.

FIG. 11 illustrates a seventh embodiment of the present invention. The seventh embodiment has a discharged fuel circulation mechanism 61 added to the first embodiment of FIG. 1 for supplying, in a circulating manner, the reformer 19 with a part of discharged fuel containing water discharged from the second fuel cell 3 on the second stage located at the furthermost stage. The rest of the configuration is similar to that of FIG. 1.

The discharged fuel circulation mechanism 61 has a fuel circulation blower 63 provided on the fuel discharge pipe 23, and a fuel circulation piping 65 for connecting the fuel circulation blower 63 and the reformer 19. The fuel circulation blower 63 is supposed to divide the discharged fuel containing water discharged from the second fuel cell 3 and send the divided discharged fuel toward both the reformer 19 and the combustor 21.

When reforming fuel, a higher reforming efficiency is obtained by steam reforming (endothermic reaction) of fuel and water than by partial oxidation reforming (exothermic reaction) of fuel and oxygen. Therefore, water generated in fuel gas due to electric power generation is supplied to the reformer 19 in a circulating manner to perform steam reforming. Accordingly, the reforming efficiency increases, and the portion of fuel used in the system also increases.

The raw fuel used in the respective embodiments described above is hydrocarbon-based or alcohol-based liquid fuel. In particular, for use in a mobile body such as an automobile, liquid fuel with a high energy density is suitable, among which hydrocarbon-based fuel such as gasoline, light oil and kerosene, or alcohol-based fuel such as methanol and ethanol is easily available with increased convenience.

The aforementioned alcohol-based fuel may contain water. In the case of alcohol fuel containing water, a relatively low combustion gas temperature suffices for the combustor 21 to warm the raw fuel before reforming, and therefore the fuel temperature after heating does not become very high. Accordingly, alcohol fuel containing water will have a low reformed fuel temperature after reforming, and a high concentration of methane in the reformed fuel. Therefore, alcohol fuel containing water turns out to be suitable for a multi-stage fuel cell system having a methane reaction suppressing function.

In addition, it is not necessary to use the discharged fuel circulation mechanism 61 which has been used in the seventh embodiment of FIG. 11 to supply water to the reformer 19 for reforming fuel by the reformer 19, whereby the system configuration may be simplified in comparison with the seventh embodiment when performing steam reforming (endothermic reaction).

Although the present invention has been described above by reference to the embodiments, the present invention is not limited to those, and it will be apparent to these skilled in the art that various modifications and improvements can be made.

For example, the configuration with the thickness of the fuel poles 49A of the first fuel cell 1A in FIG. 3 being thinned, the configuration with the fuel poles 49B of the first fuel cell 1B in FIG. 6 including a proton conductive material, and the configuration with the electrolyte 47C of the first fuel cell 1C in FIG. 7 including a proton conductive material may be combined as appropriate. In addition, the respective embodiments of FIGS. 8, 9, and 10 can be combined as appropriate.

INDUSTRIAL APPLICABILITY

The present invention is applied to a fuel cell system having a plurality of fuel cells connected in series.

REFERENCE SIGNS LIST 1, 1A, 1B, 1C, 1D, 1E, 1F first fuel cell (fuel cell on first stage)
3, 3A, 3B, 3C, 3D, 3E, 3F second fuel cell (fuel cell on second stage)
19 reformer
59 discharged fuel reformer
61 discharged fuel circulation mechanism

The invention claimed is:
1. A fuel cell system, comprising:
a plurality of fuel cells connected to each other in series; and
a reformer configured to reform raw fuel, wherein
reformed fuel by the reformer is supplied to a first stage of the plurality of fuel cells,
at least one fuel cell in the first stage is provided with a methane reaction suppressing function which suppresses reaction of methane included in the reformed fuel more than at least one fuel cell in a second stage, and
the at least one fuel cell in the first stage has an electrode with a smaller area in which fuel and oxidizer react than that of the at least one fuel cell in the second stage.
2. A fuel cell system, comprising:
a plurality of fuel cells connected to each other in series; and
a reformer configured to reform raw fuel, wherein
reformed fuel by the reformer is supplied to a first stage of the plurality of fuel cells, at least one fuel cell in the first stage is provided with a methane reaction suppressing function which suppresses reaction of methane included in the reformed fuel more than at least one fuel cell in a second stage, each of the at least one fuel cell in the first stage and the at least one fuel cell in the second stage includes fuel poles configured to form a three-phase interface, and a thickness of the fuel poles of the at least one fuel cell in the first stage is less than a thickness of the fuel poles of the at least one fuel cell in the second stage such that the methane reaction suppressing function of the at least one fuel cell in the first stage suppresses reaction of methane included in the reformed fuel more than the at least one fuel cell in the second stage.

3. The fuel cell system according to claim 1, wherein the at least one fuel cell in the first stage includes a proton conductive material as a material of fuel poles such that the at least one fuel cell in the first stage has the methane reaction suppressing function.

4. The fuel cell system according to claim 1, wherein the at least one fuel cell in the first stage includes a proton conductive material as a material of an electrolyte such that the at least one fuel cell in the first stage has the methane reaction suppressing function.

5. The fuel cell system according to claim 1, wherein the at least one fuel cell in the second stage is provided with a later-stage methane reaction suppressing function which suppresses reaction of methane included in the reformed fuel, and the later-stage methane reaction suppressing function is weaker in terms of a function of suppressing reaction of methane than the methane reaction suppressing function of the at least one fuel cell in the first stage.

6. The fuel cell system according to claim 5, further comprising at least one fuel cell in a third stage after the second stage, wherein the at least one fuel cell in the third stage is provided with a third-stage methane reaction suppressing function which suppresses reaction of methane included in the reformed fuel, the third-stage methane reaction suppressing function is weaker in terms of a function of suppressing reaction of methane than the later-stage methane reaction suppressing function.

7. The fuel cell system according to claim 1, wherein a discharged fuel reformer configured to reform discharged fuel discharged from a fuel cell of a preceding stage is provided between each pair of the plurality of fuel cells.

8. The fuel cell system according to claim 1, wherein the raw fuel is hydrocarbon-based or alcohol-based liquid fuel.

9. The fuel cell system according to claim 1, further comprising a discharged fuel circulator configured to supply, in a circulating manner, the reformer with fuel containing water discharged from a fuel cell located in a last stage of the plurality of fuel cells.

10. The fuel cell system according to claim 8, wherein the alcohol-based liquid fuel contains water.

11. The fuel cell system according to claim 2, wherein the at least one fuel cell in the first stage includes a proton conductive material as a material of the fuel poles such that the at least one fuel cell in the first stage has the methane reaction suppressing function.

12. The fuel cell system according to claim 2, wherein the at least one fuel cell in the first stage includes a proton conductive material as a material of an electrolyte such that the at least one fuel cell in the first stage has the methane reaction suppressing function.

13. The fuel cell system according to claim 2, wherein the at least one fuel cell in the second stage is provided with a later-stage methane reaction suppressing function which suppresses reaction of methane included in the reformed fuel, and the later-stage methane reaction suppressing function is weaker in terms of a function of suppressing reaction of methane than the methane reaction suppressing function of the at least one fuel cell in the first stage.

14. The fuel cell system according to claim 13, further comprising at least one fuel cell in a third stage after the second stage, wherein the at least one fuel cell in the third stage is provided with a third-stage methane reaction suppressing function which suppresses reaction of methane included in the reformed fuel, the third-stage methane reaction suppressing function is weaker in terms of a function of suppressing reaction of methane than the later-stage methane reaction suppressing function.

15. The fuel cell system according to claim 2, wherein a discharged fuel reformer configured to reform discharged fuel discharged from a fuel cell of a preceding stage is provided between each pair of the plurality of fuel cells.

16. The fuel cell system according to claim 2, wherein the raw fuel is hydrocarbon-based or alcohol-based liquid fuel.

17. The fuel cell system according to claim 2, further comprising a discharged fuel circulator configured to supply, in a circulating manner, the reformer with fuel containing water discharged from a fuel cell located in a last stage of the plurality of fuel cells.

18. The fuel cell system according to claim 16, wherein the alcohol-based liquid fuel contains water.

* * * * *